(12) United States Patent
Bells et al.

(10) Patent No.: US 8,385,941 B2
(45) Date of Patent: Feb. 26, 2013

(54) ESTIMATING A LOCATION OF A MOBILE DEVICE

(75) Inventors: Matthew Bells, Waterloo (CA); Christopher Wormald, Kitchener (CA); Gerhard Dietrich Klassen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/094,150

(22) Filed: Apr. 26, 2011

(65) Prior Publication Data

US 2011/0195725 A1    Aug. 11, 2011

Related U.S. Application Data

(63) Continuation of application No. 11/390,214, filed on Mar. 28, 2006, now Pat. No. 7,945,270.

(51) Int. Cl.
*H04W 24/00* (2009.01)

(52) U.S. Cl. ............ 455/456.1; 455/456.2; 455/456.3

(58) Field of Classification Search ........... 455/456.1
See application file for complete search history.

(56) References Cited

U.S. PATENT DOCUMENTS

| | | | |
|---|---|---|---|
| 5,844,522 A | 12/1998 | Sheffer et al. | |
| 6,026,305 A | 2/2000 | Salinger et al. | |
| 6,055,434 A | 4/2000 | Seraj | |
| 6,441,752 B1 | 8/2002 | Fomukong | |
| 6,628,953 B1 * | 9/2003 | Dillon et al. | 455/452.1 |
| 7,460,870 B2 * | 12/2008 | Moeglein et al. | 455/456.1 |
| 7,574,224 B2 | 8/2009 | Lane et al. | |
| 2003/0125046 A1 | 7/2003 | Riley et al. | |
| 2004/0104841 A1 | 6/2004 | Syrjarinne | |
| 2005/0003835 A1 | 1/2005 | Riise et al. | |
| 2005/0288033 A1 * | 12/2005 | McNew et al. | 455/456.1 |
| 2009/0005972 A1 | 1/2009 | de Koning | |

FOREIGN PATENT DOCUMENTS

| | | |
|---|---|---|
| EP | 1237009 | 9/2002 |
| EP | 1521490 A1 | 4/2005 |
| WO | 02/054813 | 7/2002 |
| WO | 03010552 | 2/2003 |
| WO | 03/045096 | 5/2003 |
| WO | 2004012352 | 2/2004 |
| WO | 2004068776 A2 | 8/2004 |

OTHER PUBLICATIONS

"How the Wireless Phone GPS Works", San Francisco Chronicle, Mar. 19, 2001.
Telecommunications Industry Association, "Industry Trends : Technology", PulseOnline, Sep. 2000.
"Sprint Launches SDP", May 16, 2005.
Matt, Stefan, "EESR", Extended European Search Report for EP 06111857.6, Jul. 6, 2006.

(Continued)

*Primary Examiner* — Charles Appiah
*Assistant Examiner* — Natasha Cosme
(74) *Attorney, Agent, or Firm* — Integral Intellectual Property Inc.; Miriam Paton (57) ABSTRACT

The approximate location of a directed cell of a cellular network is calculated based on locations in the vicinity of which mobile devices were able to detect the directed cell. A mobile device is able to estimate its own location from the approximate locations of one or more directed cells that it can identify. This estimated location of the mobile device may be used to seed its GPS receiver.

21 Claims, 8 Drawing Sheets

OTHER PUBLICATIONS

Matt, Stefan, Third Exam Report for EP 06111857.6 Aug. 18, 2010.
Crowe, David, "Cellular Networking Perspectives", www.cnp-wireless.com/ArticleArchive/Wireless%20Telecom/2001Q3-LCS.html; 2001.
Kotylak, Timothy, International Search Report for PCT/CA2007/000446, Jul. 17, 2007.
Kotylak, Timothy, Written Opinion of the International Searching Authority for PCT/CA2007/000446, Jul. 17, 2007.
Laitinen, Heikki et al., "Cellular network optimisation based on mobile location", Oct. 25, 2001.
Matt, Stefan, Second Exam Report for EP 06111857.6, Dec. 23, 2008.

* cited by examiner

ESTIMATING A LOCATION OF A MOBILE DEVICE

CROSS-REFERENCE TO RELATED APPLICATIONS

This application is a continuation of U.S. patent application Ser. No. 11/390,214 filed Mar. 28, 2006, entitled "Estimating a Location of a Mobile Device", which will issue on May 17, 2011 as U.S. Pat. No. 7,945,270, and which is incorporated by reference in its entirety.

BACKGROUND

Information about the location of a mobile device may be required in order to comply with the Enhanced 911 (E911) directive set by the Federal Communications Commission (FCC). In addition, a location of a mobile device may be used in providing location-based services (LBS) to a user of the mobile device.

One method for a mobile device to find its location is the use of Global Positioning System (GPS). In another method, denoted Assisted GPS, a mobile device may receive a location of a nearby base station and may optionally use it for connecting to satellites of the GPS, shortening the overall time needed for the process. Cellular network operators currently charge for using the service.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some elements may be exaggerated relative to other elements for clarity.

DETAILED DESCRIPTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

According to embodiments of the invention, a location approximation system is coupled to a cellular network. The location approximation system collects information from cellular mobile devices about their locations and about the cellular network. The location approximation system may be able to approximate the location of a cell based at least in part on the collected information.

Figure 1:
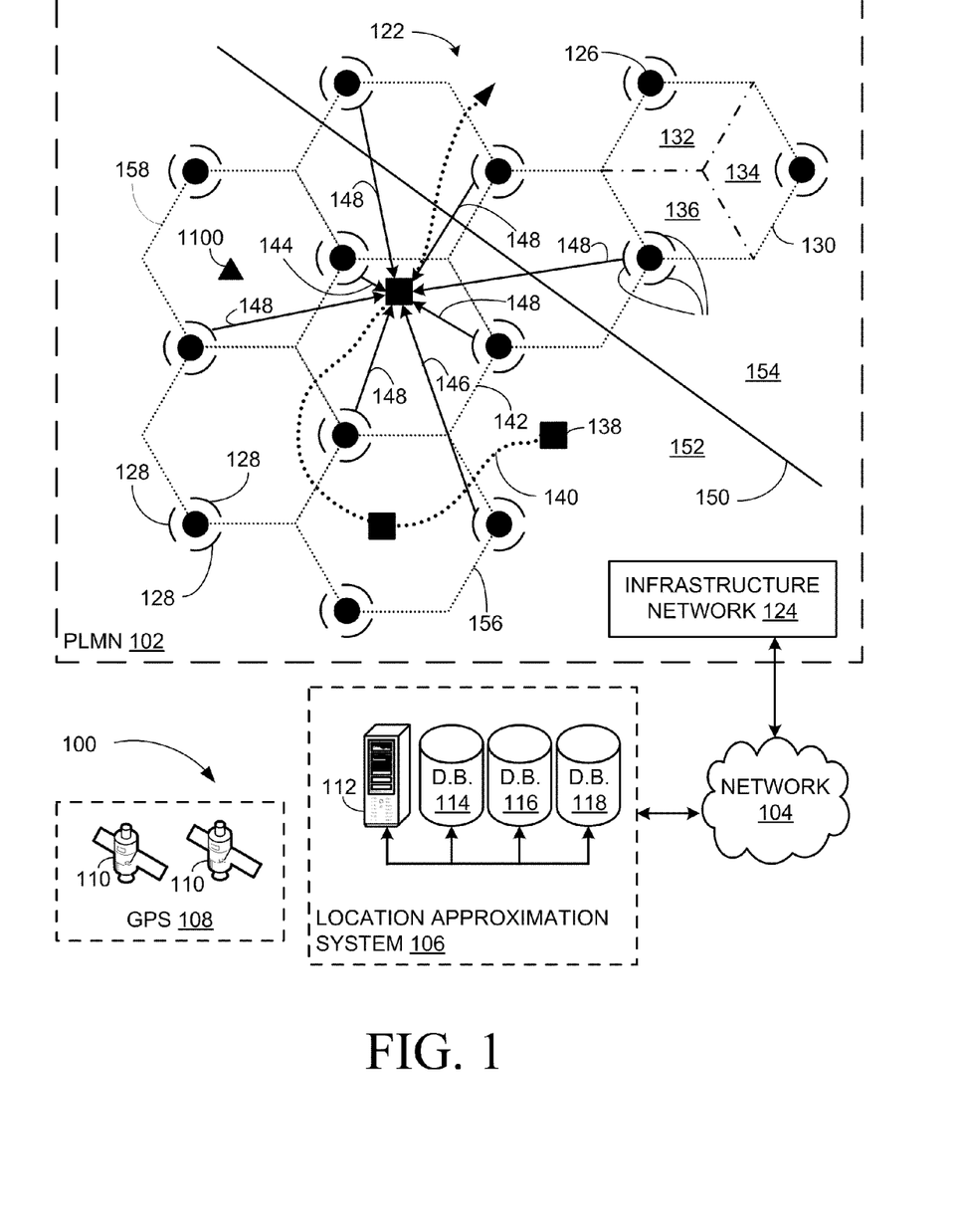
FIG. 1 is an illustration of an exemplary communications system, according to some embodiments of the invention.

FIG. 1 is an illustration of an exemplary communications system 100, according to some embodiments of the invention. Communications system 100 includes a private/public land mobile network (PLMN) 102, a network 104, a location approximation system 106 and a GPS satellite system 108. GPS system 108 includes satellites 110 of which only two are shown.

Network 104 may include any combination of wired, wireless and optical networks, and may include additional communication devices (not shown) such as gateways, routers, switches, and the like. Network 104 may include any combination of private networks, public networks and the Internet.

System 106 includes a server 112 and databases 114, 116 and 118, coupled to server 112. PLMN 102 includes a cellular network 122 and an infrastructure network 124. Cellular network 122 includes base stations 126, of which thirteen are shown, that are in communication with infrastructure 124. System 106 may be able to communicate with infrastructure 124 via network 104.

A non-exhaustive list of examples for communication standards used within cellular network 122 includes Direct Sequence-Code Division Multiple Access (DS-CDMA) cellular radiotelephone communication, Global System for Mobile Communications (GSM) cellular radiotelephone, North American Digital Cellular (NADC) cellular radiotelephone, Time Division Multiple Access (TDMA), Extended-TDMA (E-TDMA) cellular radiotelephone, wideband CDMA (WCDMA), General Packet Radio Service (GPRS), Enhanced Data for GSM, Evolution (EDGE), 3G and 4G communication.

In system 100, base stations 126 have three directional antennae 128, although this is merely an example and in other communication systems the base stations may have any other number of directional antennae. Directional antennae 128 are arranged on base stations 126 to transmit and/or receive signals primarily in sectors of 120°, therefore three directional antennae 128 may cover together 360° around any of base stations 126. Any three directional antennae 128 of neighboring base stations 126 that are pointing to a common point form together a logical unit commonly knows as a cell. The area of a cell is commonly shown as a hexagon, although this is an inaccurate schematic representation of the areas actually covered by the directional antennae forming the cell.

The cell itself is divided into three "directed cells", each located near the closest base station. For example, a cell 130 is divided into directed cells 132, 134 and 136. Transmissions from directional antennae 128 may include unique identifications that identify any particular one of the directed cells.

Users may carry cellular mobile devices through areas covered by cellular network 122. For example, a mobile device 138 is shown to be carried along a trajectory 140 through cellular network 122.

Figure 2:
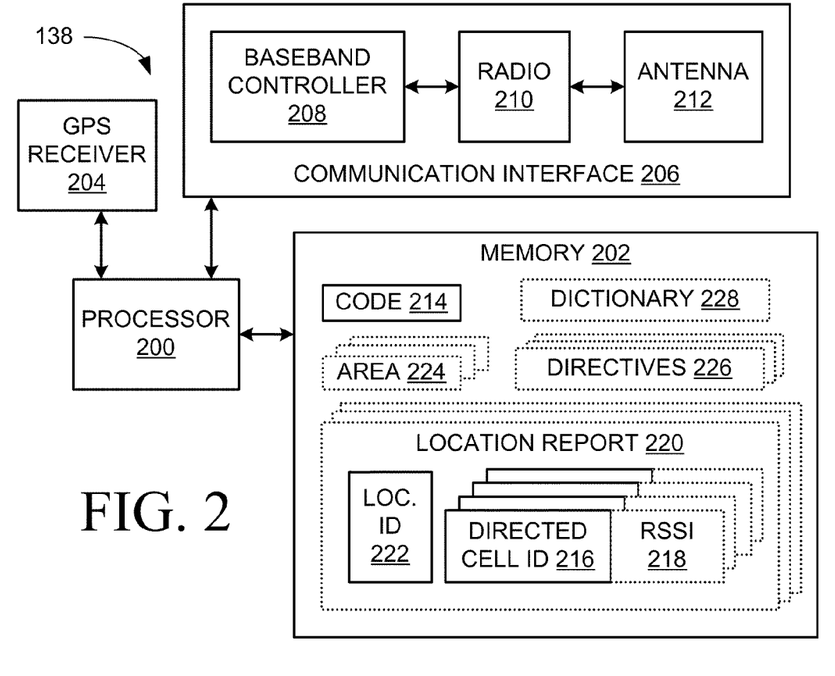
FIG. 2 is a block diagram of an exemplary mobile device, according to some embodiments of the invention.

FIG. 2 is a block diagram of exemplary mobile device 138, according to some embodiments of the invention. A non-exhaustive list of examples for mobile device 138 includes a wireless cellular phone, a wireless-enabled laptop, a wireless-enabled personal digital assistant (PDA), a wireless-enabled smart phone, a wireless-enabled gaming console, and any other suitable mobile device.

Mobile device 138 includes a processor 200, and a memory 202, a GPS receiver 204 and a wireless communication interface 206, all coupled to processor 200. For clarity, other components of mobile device 138 are not shown in FIG. 2.

GPS receiver 204 is able to receive signals originating from satellites 110, and mobile device 138 may be able to calculate its location from information included in the signals.

Communication interface 206 includes at least a baseband controller 208, a radio 210, and an antenna 212 and may be able to communicate with any of directional antennae 128. If the signals from a directional antenna received by mobile device 138 are stronger than a threshold, mobile device 138 may be able to identify the directed cell and to measure received signal strength (RSSI) of the received signals. Possibly, mobile device 138 may also be able to establish communications with the particular directed cell.

Memory 202 stores code 214 that when executed by processor 202 may cause mobile device 138 to perform its part in the methods described in FIGS. 5 and 6 below.

Returning to FIG. 1, while at the location shown in a cell 142, mobile device 138 may receive signals 144, 146 and 148 that are stronger than the threshold from eight directional antennae 128. Mobile device 138 may be able to identify the eight directed cells of the directional antennae that generate the signals and to measure RSSI of the signals. As shown in FIG. 2, the identifications 216 of the directed cells and optionally the RSSI measurements 218 of the signals identifying the directed cells may be stored in mobile device 138 in a location report 220 labeled with an identifier 222 of the location.

Many parameters, such as weather and transmission strength, can affect RSSI measurements. However, as a rule of thumb, RSSI measurement of a signal decreases as the distance between the transmitter and the receiver increases. Therefore, while at the location shown in cell 142, mobile device 138 may measure the strongest RSSI for signal 144, which originates from a directed antenna that is the closest to mobile device 138, and may measure the weakest RSSI for signal 148, which originates from a directed antenna that is the farthest (of the eight) from mobile device 138.

Other parameters are also proportional to the distance between the transmitter and the receiver. For example, in some networks, the base stations ask the mobile devices to adjust their transmit power. In such networks, the transmit power of mobile device 138 may be considered an indication of the distance between mobile device 138 and base station 126. In another example, a time offset gleaned from the signal may be an indication of the distance between mobile device 138 and base station 126. Consequently, location reports 220 may include the transmit power and/or time offset instead of, or in addition to, the RSSI measurements 218.

Figure 3:
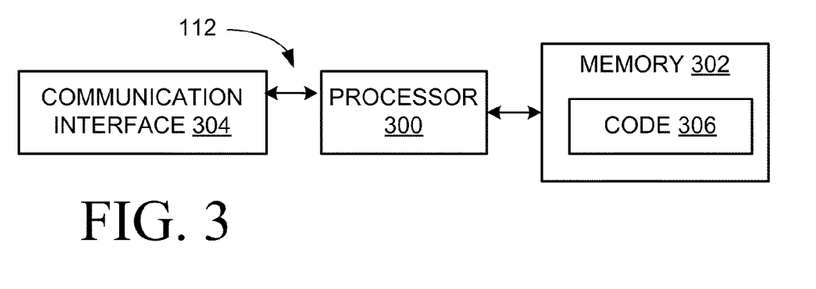
FIG. 3 is a block diagram of a server in a location approximation system, according to some embodiments of the invention.

FIG. 3 is a block diagram of an exemplary server 112, according to some embodiments of the invention. Server 112 includes a processor 300, and a memory 302 and a communication interface 304 coupled to processor 300. For clarity, other components of server 112 are not shown in FIG. 3. Server 112 is able to communicate with network 104 by way of interface 304. Memory 302 stores a code 306 that when executed by processor 302 may cause server 112 to perform its part in the methods described in FIGS. 5, 7, 10 and 12.

Figure 4:
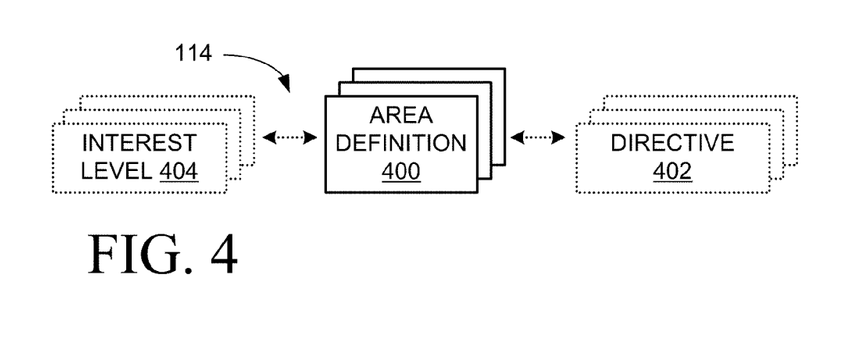
FIG. 4 shows of exemplary content of a database of a location approximation system, according to embodiments of the invention.

System 106 may attempt to collect information about cellular networks such as cellular network 122 from mobile devices such as mobile device 138. FIG. 4 shows the exemplary content of database 114, according to embodiments of the invention. Database 114 may include one or more definitions 400 of geographical areas of any suitable sizes and shapes. Geographical areas may be defined in any suitable way, for example, by polygons. For example, a straight line 150 is shown in FIG. 1 to be the common boundary of an exemplary geographical area 152 and an exemplary geographical area 154. Some parts of cellular network 122 are located in area 152 and other parts of cellular network 122 are located in area 154.

Database 114 may optionally include one or more directives 402 and any of area definitions 400 may be linked to any of directives 402. If, for example, a particular one of area definitions 400 defines area 154 and is linked to a particular directive 402, the particular directive 402 may define, at least in part, how a mobile device that is located within area 154 should collect information about cellular network 122.

Directives 402 may define, for example, sampling time intervals for mobile devices to sample a cellular network and/or changes in the locations of mobile devices that should trigger the mobile devices to sample the cellular network. In another example, directives 402 may define reporting time intervals for mobile devices to transfer collected information to system 106.

Database 114 may optionally include one or more definitions 404 of interest levels and any of area definitions 400 may be linked to any of interest levels 404. Interest levels 404 may store numerical values or any other suitable representations of the levels of interest of system 106 in receiving information originating from geographical areas. Any particular one of area definitions 400 may be linked to a particular directive 402 or a particular interest level 404.

Figure 5:
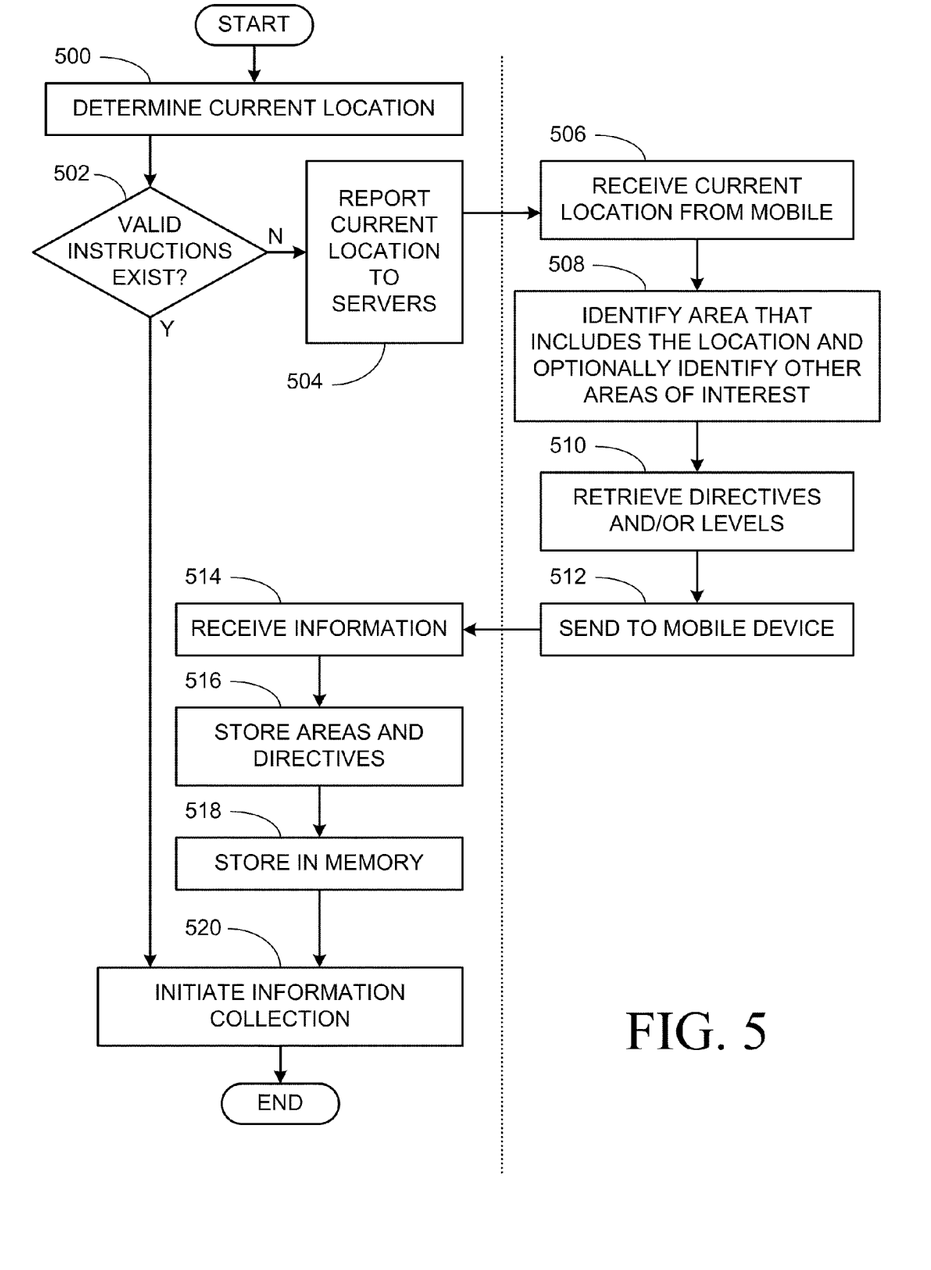
FIG. 5 is a flowchart of an exemplary method for a mobile device and for a server of a location approximation system, according to some embodiments of the invention.

FIG. 5 is a flowchart of an exemplary method for a mobile device, for example, mobile device 138, and for server 112, according to some embodiments of the invention. At 500, mobile device 138 determines its current location, for example, by using GPS receiver 204.

At 502, mobile device 138 checks whether memory 202 stores valid instructions for data collection at the vicinity of its location. As shown in FIG. 2, memory 202 may store one or more area definitions 224 and one or more directives 226. If a particular area definition 224 defines an area in which mobile device 138 is currently located and a directive 226 linked to that particular definition 224 includes valid collection instructions, the method may continue to 520.

Otherwise, at 504, mobile device 138 reports its current location to system 106 and at 506, server 112 may receive the report. At 508, server 112 may retrieve from database 114 a particular area definition 400 that defines an area including the current location of mobile device 138. For example, if the current location of mobile device 138 is as shown in FIG. 1 in a cell 156, server 112 may retrieve an area definition 400 for area 152. In addition, server 112 may optionally retrieve other area definitions 400 that define other areas of interest, for example, areas in the vicinity of area 152, e.g. area 154.

At 510, server 112 may retrieve from database 114 directives 402 and/or interest levels 404 that are linked to the retrieved area definitions 400. At 512, server 112 may transmit the retrieved information to mobile device 138 and at 514, mobile device 138 may receive the information.

At 516, mobile device 138 may store directives 400 and interest levels 404 received at 514 in fields 224 and 226, respectively in memory 202 (shown in FIG. 2).

A dictionary 228 (shown in FIG. 2) may be stored in memory 202. Dictionary 228 may receive as input any of interest levels 404 and may output corresponding instructions similar to directives 402. If mobile device 138 receives at 514 any of interest levels 404, at 518, device 138 may use dictionary 228 to identify corresponding directives and may store those directives in fields 226. At 520, mobile device 138 initiates collection of information and the method terminates.

Figure 6:
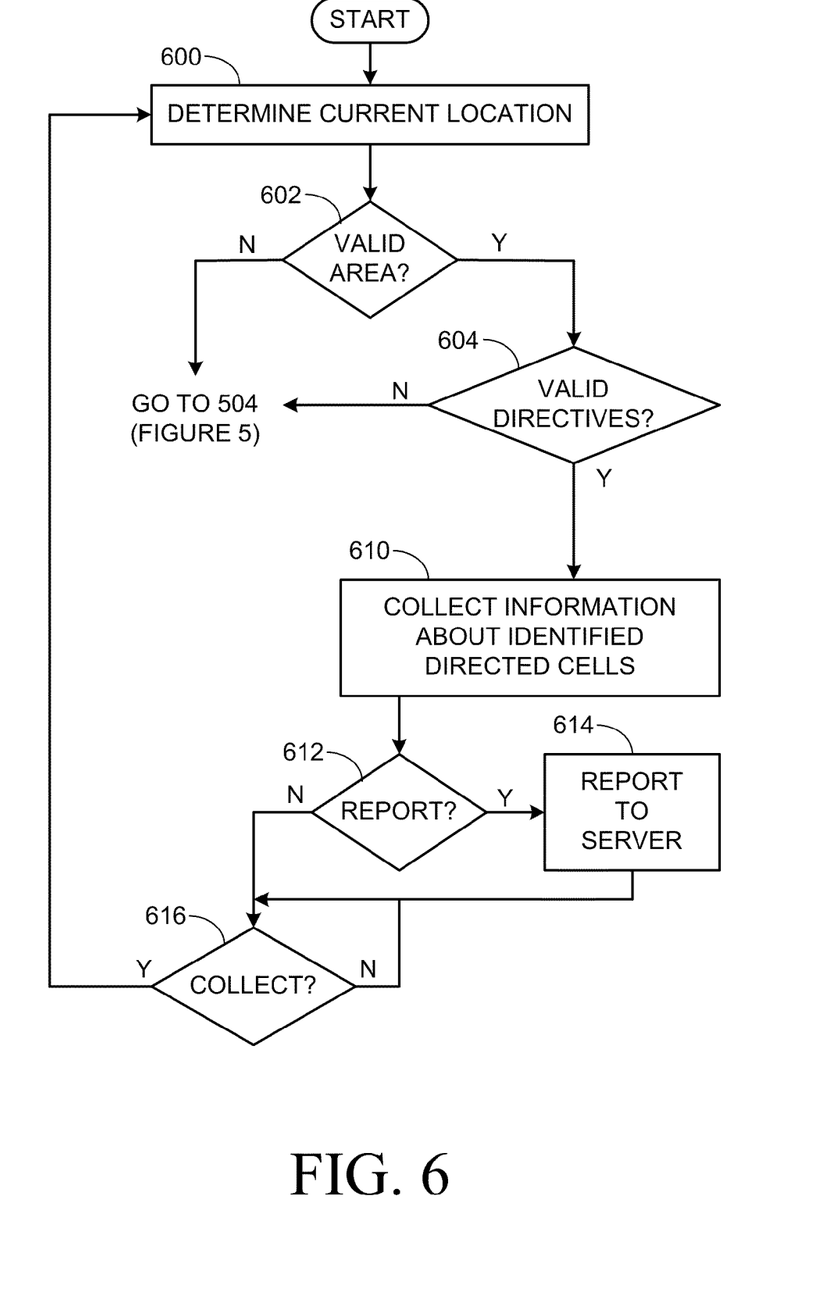
FIG. 6 is a flowchart of an exemplary method for a mobile device for collecting information, according to some embodiments of the invention.

FIG. 6 is a flowchart of an exemplary method for a mobile device, for example mobile device 138, for collecting information, according to some embodiments of the invention. At 600, mobile device 138 determines its current location. If memory 202 does not store a definition 224 of an area containing the location determined at 600 (checked at 602), or if memory 202 does not store valid directives 226 for that area (checked at 604), the method may proceed to step 504 of FIG. 5. For example, a directive 226 may not be valid if it has an expired time tag.

Otherwise, at 610 and according to area definition 224 and directives 226 recognized at 602 and 604, respectively, while in the vicinity of the determined location, mobile device 138 collects information from signals it receives from directional antennae. Mobile device 138 may store the information collected at 600 and 610 as one location report 220 in memory 202.

At 612, mobile device 138 checks whether, according to the directives 226 for the area in which the current mobile device 138 is located, it is time for device 138 to report location reports 220 to system 106. If so, then at 614 mobile device 138 may transmit location reports 220 that are stored in memory 202 to system 106. Device 138 may wait at 616 until, according to the directives for the area in which the current mobile device 138 is located, it is time for mobile device 138 to collect more information and the method may continue to 600.

Figure 7:
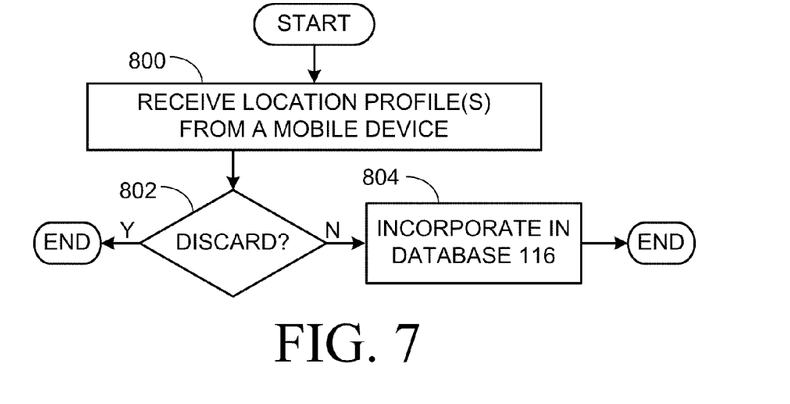
FIG. 7 is a flowchart of an exemplary method in a location approximation system, according to some embodiments of the invention.

FIG. 7 is a flowchart of an exemplary method in system 106, according to some embodiments of the invention.

Many mobile devices, such as mobile device 138, may collect location reports 220, and may send several location reports 220 to system 106. At 700, server 112 may receive a particular location report 220 from mobile device 138. Server 112 may decide at 702 not to incorporate the particular location report 220 into database 116 and the method may terminate. Otherwise, at 704, server 112 may incorporate information included in the particular location report 220 into one or more of directed cell reports, and may optionally discard from database 116 information previously incorporated from other location reports.

Figure 8:
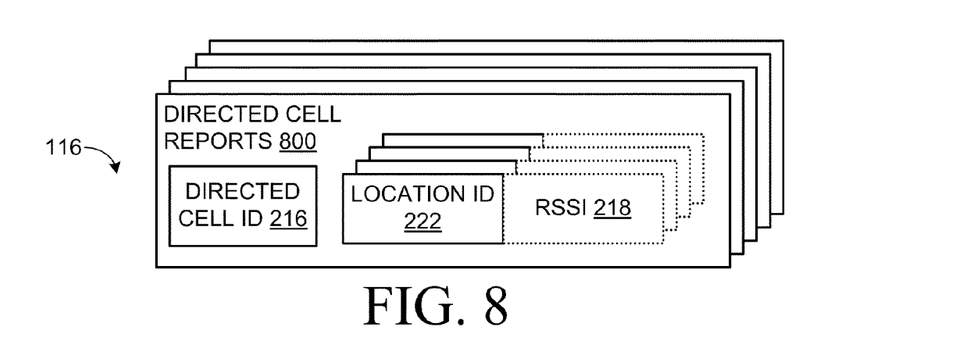
FIG. 8 shows exemplary directed cell reports stored in a database of a location approximation system, according to embodiments of the invention.

Information in selected location reports 220 received by system 106 from various mobile devices is collated into directed cell reports stored in database 116. FIG. 8 shows exemplary directed cell reports stored in database 116, according to embodiments of the invention. A directed cell report 800 identifies the directed cell for which it contains information with identification 216. Directed cell report 800 also includes those location identifiers 222 of location reports 220 that included directed cell ID 216. Optionally, directed cell report 800 also includes RSSI measurements 218 for the directed cell identified by ID 216 obtained from location reports 220 that included directed cell ID 216. In other embodiments, directed cell report 800 includes transmit powers and/or time offsets instead of or in addition to the RSSI measurements.

A location report can therefore be understood as identifying the directed cells whose signals were received by mobile devices when in the location identified by the location ID of the location report. The location report may also include RSSI measurements of the signals, time offsets gleaned from the signals and/or transmit powers of the mobile devices when in the location identified by the location ID of the location report.

A directed cell report can be understood as identifying the locations at which mobile devices were able to identify received signals as originating in the directed cell. The directed cell report may also include RSSI measurements of those received signals, time offsets gleaned from the signals, and/or transmit powers of the mobile devices.

Figure 9:
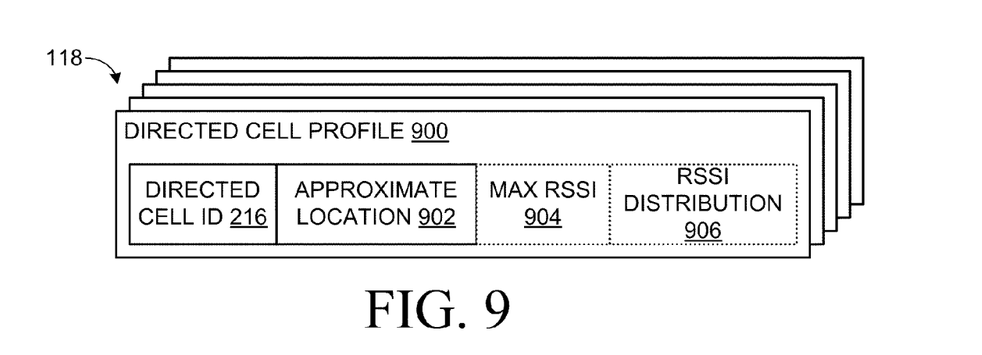
FIG. 9 shows exemplary directed cell profiles stored in a database of a location approximation system, according to embodiments of the invention.
Figure 10:
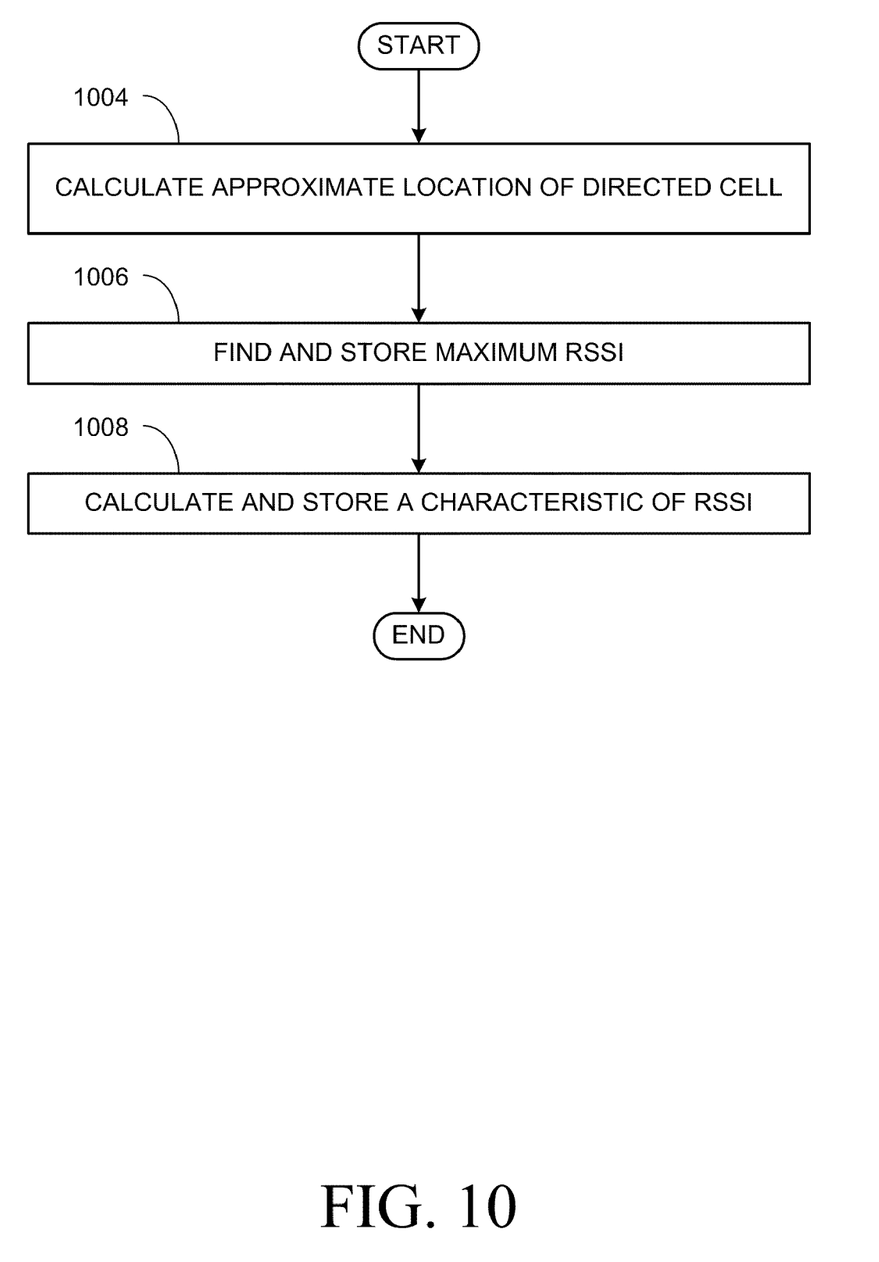
FIG. 10 is a flowchart of an exemplary method in a location approximation system, according to some embodiments of the invention.

FIG. 9 shows exemplary directed cell profiles 900 in database 118, according to embodiments of the invention. FIG. 10 is a flowchart of an exemplary method in system 106, according to some embodiments of the invention.

Any of directed cell reports 800 may include a vast amount of locations 222 and optionally RSSI measurements 218, for example few hundreds to tenth of thousands. Once enough information has been stored in a particular directed cell report 800, or when the particular directed cell report 800 has been updated, or for any other reason, server 112 may create or update a directed cell profile 900 in database 118 that has the same directed cell ID 216.

At 1004, a server 112 calculates the approximate location of the directed cell identified by directed cell ID 216 from at least locations 222 in the corresponding directed cell report 800. For example, server 112 may calculate the median or average of locations 222, separately for each axis (e.g. longitude and latitude). Server 112 may store the approximate location in a field 902 in the particular directed cell profile 900. It should be noted that the approximate location of a particular directed cell calculated by server 112 from locations 222 in the corresponding directed cell report 800 is likely different than the location of base station 126 a directional antenna of which transmits signals for the particular directed cell.

At 1006, server 112 may optionally store the maximal one of RSSI measurements 218 in a field 904 in the particular directed cell profile 900. At 1008, server 112 may optionally calculate a statistical characteristic, for example, standard deviation, of RSSI measurements 218 and may store the result in a field 906 in the particular directed cell profile 900. In other embodiments, server 112 may optionally store the maximal transmit power and/or time offset and/or statistical characteristics thereof in the particular directed cell profile.

Figure 11:
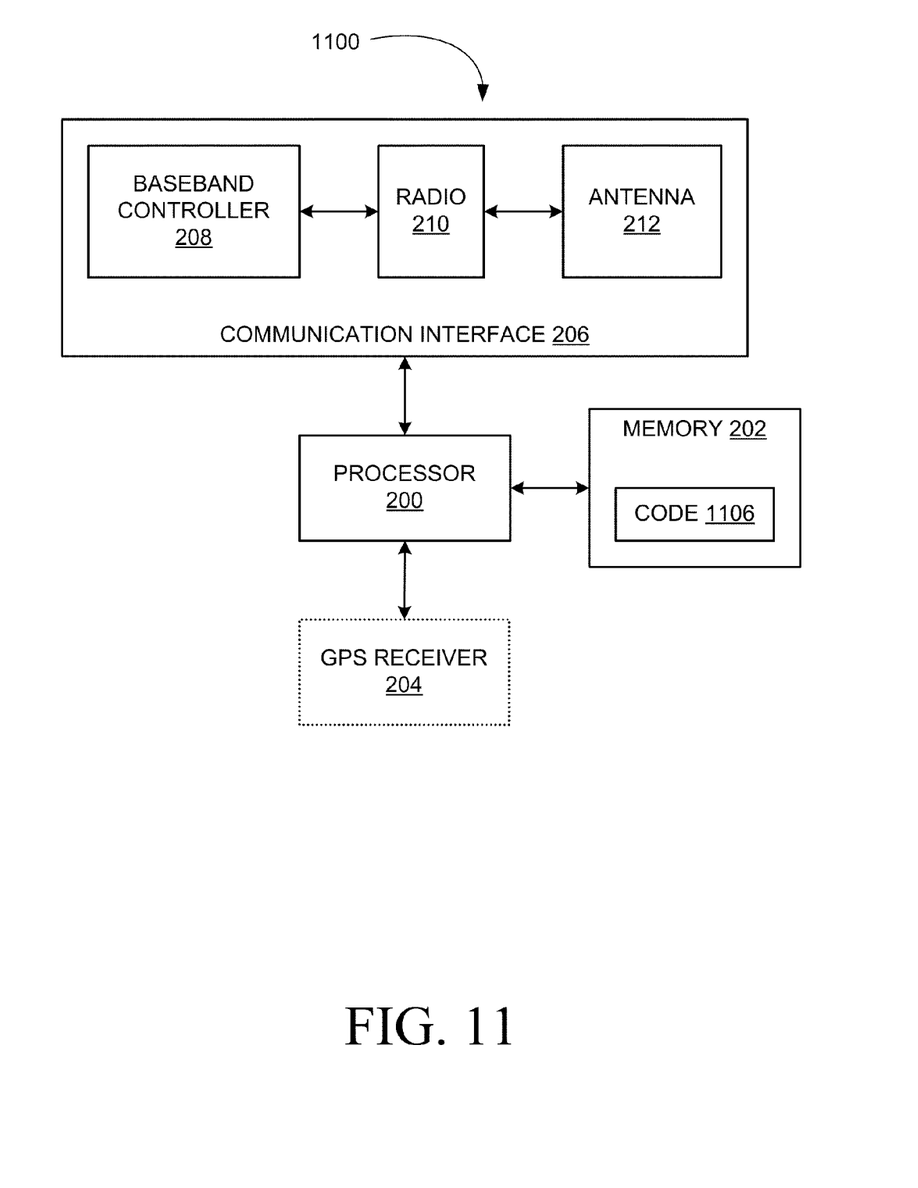
FIG. 11 is a block diagram of an exemplary mobile device, according to some embodiments of the invention.

FIG. 11 is a block diagram of an exemplary mobile device 1100, according to some embodiments of the invention. FIG. 11 is similar to FIG. 2 except that code 1106 stored in memory 202 implements its part of the method described in FIG. 12. In addition, mobile device 1100 is not necessarily equipped with GPS receiver 204.

Figure 12:
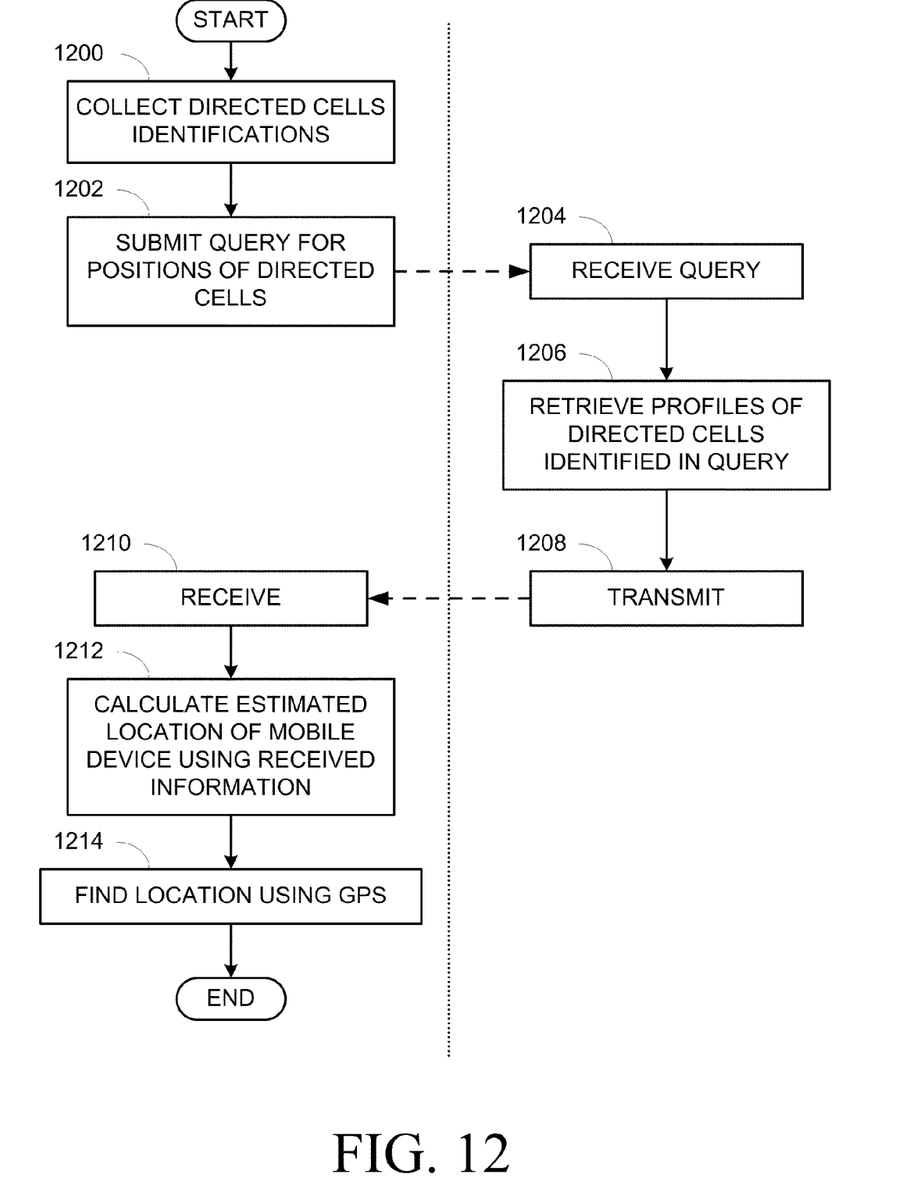
FIG. 12 is a flowchart of an exemplary method for a mobile device, according to some embodiments of the invention.

FIG. 12 is a flowchart of an exemplary method for mobile device 1100 and server 112, according to some embodiments of the invention. As shown in FIG. 1, device 1100 is located in a cell 158 in area 152. At 1200, device 1100 collects identifications of one or more directed cells in its vicinity. These directed cells are identified from signals received by device 1100 from directional antennae 128 in cellular network 122. Device 1100 may also measure the RSSI of those signals. In other embodiments, device 1100 may glean time offsets of those signals and/or note its transmit power at the time the signals were received. At 1202, device 1100 may transmit to system 106 a query for positions of the identified directed cells, and server 112 may receive the query at 1204.

At 1206, server 112 may retrieve from database 118 one or more directed cell profiles 900 corresponding to the directed cells identified in the query. At 1208, server 112 may transmit the retrieved directed cell profiles 900 and at 1210, device 1100 receives the transmission. The information received at 1210 may be cached by device 1100 for future reference, thus circumventing the need to request the locations of directed cells more than once.

At 1212, device 1100 may optionally estimate its location from the information received at 1210. For example, if the query is for the position of a single directed cell, then device 1100 may estimate its location as the approximate location of the directed cell received from server 112. If the query is for the positions of two or more directed cells, then device 1100 may estimate its location for each axis as the weighted average of the coordinates of each directed cell, where the weight function is a linear mapping of signal strength from each directed cell. For example, if the query is for the positions of directed cells A, B and C, and device 1100 has measured RSSI values $RSSI_A$, $RSSI_B$ and $RSSI_C$ respectively for signals identifying those directed cells, and the positions received from server 112 are in latitude and longitude coordinates, then the calculation is as follows:

$$\text{device lat} = \frac{w(RSSI_A) \cdot lat_A + w(RSSI_B) \cdot lat_B + w(RSSI_C) \cdot lat_C}{w(RSSI_A) + w(RSSI_B) + w(RSSI_C)}$$

$$\text{device long} = \frac{w(RSSI_A) \cdot long_A + w(RSSI_B) \cdot long_B + w(RSSI_C) \cdot long_C}{w(RSSI_A) + w(RSSI_B) + w(RSSI_C)}$$

where w is the weight function. In other embodiments, the weight function is a linear mapping of transmit power and/or time offset.

At 1214, if equipped with GPS receiver 204, device 1100 may optionally use its approximated location to communicate with satellites 110. This may shorten the time required for GPS receiver 204 to determine a more precise location of device 1100.

Many modifications will occur to persons of ordinary skill in the art. For example, databases 114, 116 and 118 may be a single database or distributed databases. In another example, separate servers may substitute for server 112.

It will be appreciated by persons of ordinary skill in the art how to modify the foregoing to apply to other radio frequency (RF) communication systems. The term "directed cell" may therefore be understood to include any transmit area from any uniquely identifiable RF source. For example, if omnidirectional antennae are substituted for the directional antennae described hereinabove, then the directed cell is understood to be the entire cell. In another example, if the communication system is an IEEE 802.11 WLAN system and access points are substituted for the base stations described hereinabove, then the directed cell is understood to be the coverage area of the access point.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for estimating a location of a mobile device in a network, the method comprising:
   identifying two or more uniquely identifiable radio frequency sources of the network from signals received by the mobile device at the location;
   receiving approximate locations of two or more transmit areas from the uniquely identifiable radio frequency sources;
   determining for each signal received by the mobile device one or more parameters that are proportional to a distance between the frequency source originating the signal and the mobile device; and
   estimating the location of the mobile device from the approximate locations and the one or more parameters, wherein at least one of the parameters is a transmit power of the mobile device at the time one of the signals was received.

2. The method of claim 1, wherein at least one of the parameters is a signal strength measurement (RSSI) of one of the signals, the method further comprising:
   receiving a maximal RSSI measurement measured by another mobile device from one of the two or more uniquely identifiable radio frequency sources; and
   taking into account the maximal RSSI measurement in estimating the location of the mobile device.

3. The method of claim 2, wherein the approximate locations are provided as coordinates on axes and estimating the location from the approximate locations and the one or more parameters comprises:
   estimating the location as a weighted average of the coordinates on each of the axes, where weights used in calculating the weighted average are linear functions of signal strength measurements of signals from which the mobile device identified the uniquely identifiable radio frequency sources.

4. The method of claim 1, wherein at least one of the parameters is a time offset gleaned from one of the signals.

5. The method of claim 1 wherein the network is a cellular network, the uniquely identifiable radio frequency sources are base stations of the cellular network having directional antennae, and the transmit areas are directed cells of the cellular network.

6. The method of claim 1 wherein the network is a cellular network, the uniquely identifiable radio frequency sources are base stations of the cellular network having omnidirectional antennae, and the transmit areas are entire cells of the cellular network.

7. The method of claim 1 wherein the network is a wireless local area network, the uniquely identifiable radio frequency sources are access points of the wireless local area network, and the transmit areas are the coverage areas of the access points.

8. A method for assisting a mobile device to estimate its location in a network, the method comprising:
   receiving from mobile devices location reports that include locations of the mobile devices, an identification of a uniquely identifiable radio frequency source in the network identified by the mobile devices at the locations, and transmit powers of the mobile devices to the uniquely identifiable radio frequency source at the locations;
   constructing from the location reports a radio frequency source profile for the uniquely identifiable radio frequency source, the radio frequency source profile including information based on the transmit powers and including an approximate location of a transmit area for the uniquely identifiable radio frequency source;

receiving from the mobile device a query that identifies the uniquely identifiable radio frequency source; and in response to the query, transmitting the radio frequency source profile to the mobile device to enable the mobile device to use the approximate location and the information in estimating its location.

9. The method of claim 8, wherein the information comprises a maximal transmit power of the transmit powers.

10. The method of claim 8, wherein the information comprises a statistical characteristic of the transmit powers.

11. The method of claim 8, further comprising:

determining the approximate location as a set of coordinates on perpendicular axes, wherein the set of coordinates represents statistical characteristics of the locations.

12. The method of claim 8, wherein the network is a cellular network, the uniquely identifiable radio frequency source is a base station of the cellular network having directional antennae, and the transmit area is a directed cell of the cellular network.

13. The method of claim 8, wherein the network is a cellular network, the uniquely identifiable radio frequency source is a base station of the cellular network having an omnidirectional antenna, and the transmit area is an entire cell of the cellular network.

14. The method of claim 8, wherein the network is a wireless local area network, the uniquely identifiable radio frequency source is an access point of the wireless local area network, and the transmit area is a coverage area of the access point.

15. A location approximation system comprising:

a database to store a radio frequency source profile for a uniquely identifiable radio frequency source of a first network, the radio frequency source profile including an approximate location of a transmit area for the uniquely identifiable radio frequency source, wherein the uniquely identifiable radio frequency source is able to communicate with an infrastructure network;

a server coupled to the database; and means for communicating with the infrastructure network, wherein the server is arranged to receive from mobile devices location reports that include locations of the mobile devices, an identification of the uniquely identifiable radio frequency source identified by the mobile devices at the locations, and transmit powers of the mobile devices to the uniquely identifiable radio frequency source at the locations, wherein the server is further arranged to construct the radio frequency source profile from the location reports, wherein the radio frequency source profile includes information related to the transmit powers, and wherein, in response to receipt by the server of a query from a mobile device identifying the uniquely identifiable radio frequency source, the server is arranged to transmit the radio frequency source profile to the mobile device to enable the mobile device to use the approximate location and the information in estimating its location.

16. The location approximation system of claim 15, wherein the information comprises a maximal transmit power of the transmit powers.

17. The location approximation system of claim 15, wherein the information comprises a statistical characteristic of the transmit powers.

18. The location approximation system of claim 15, wherein the server is further adapted to determine the approximate location as a set of coordinates on perpendicular axes, wherein the set of coordinates represents statistical characteristics of the locations.

19. The location approximation system of claim 15, wherein the network is a cellular network, the uniquely identifiable radio frequency source is a base station of the cellular network having directional antennae, and the transmit area is a directed cell of the cellular network.

20. The location approximation system of claim 15, wherein the network is a cellular network, the uniquely identifiable radio frequency source is a base station of the cellular network having an omnidirectional antenna, and the transmit area is an entire cell of the cellular network.

21. The location approximation system of claim 15, wherein the network is a wireless local area network, the uniquely identifiable radio frequency source is an access point of the wireless local area network, and the transmit area is a coverage area of the access point.

* * * * *